(12) United States Patent
De Klerk

(10) Patent No.: US 10,011,789 B2
(45) Date of Patent: Jul. 3, 2018

(54) FISCHER-TROPSCH JET FUEL PROCESS

(71) Applicant: Arno De Klerk, Hatfield (ZA)

(72) Inventor: Arno De Klerk, Hatfield (ZA)

(73) Assignee: Sasol Technology (Pty) Ltd., Sandton, Johannesburg (ZA)

( * ) Notice: Subject to any disclaimer, the term of this patent is extended or adjusted under 35 U.S.C. 154(b) by 733 days.

(21) Appl. No.: 13/999,021

(22) Filed: Jan. 2, 2014

(65) Prior Publication Data

US 2014/0326640 A1 Nov. 6, 2014

Related U.S. Application Data

(63) Continuation of application No. 12/595,447, filed on Jan. 12, 2010, now abandoned.

(51) Int. Cl.
*C10G 69/12* (2006.01)
*C10G 45/00* (2006.01)
(Continued)

(52) U.S. Cl.
CPC .............. *C10G 69/123* (2013.01); *C10G 3/50* (2013.01); *C10G 45/00* (2013.01); *C10G 45/58* (2013.01); *C10G 50/00* (2013.01); *C10G 57/005* (2013.01); *C10G 57/02* (2013.01); *C10G 65/046* (2013.01); *C10L 1/04* (2013.01);
(Continued)

(58) Field of Classification Search
CPC ........ C10G 69/123; C10G 57/02; C10G 3/50; C10G 45/00; C10G 50/00; C10G 65/046; C10G 57/005; C10G 45/58; C10G 2300/1022; C10L 1/04; Y02P 30/20
See application file for complete search history.

(56) References Cited

U.S. PATENT DOCUMENTS 3,535,228 A * 10/1970 Hughes .................... B01J 21/16
208/111.1
7,756,978 B2 * 7/2010 Nakaminami ...... H04L 67/1008
709/220
(Continued)

OTHER PUBLICATIONS

Leckel et al, Butene Oligomerization by Phosphoric Acid catalyst, Jul. 2003, Ind. Eng. Chem. Res. vol. 45, No. 18.*

*Primary Examiner* — Randy Boyer
*Assistant Examiner* — Juan Valencia
(74) *Attorney, Agent, or Firm* — Hughes Socol Piers Resnick & Dym, Ltd.

(57) ABSTRACT

The invention provides a Fischer-Tropsch jet fuel refining process which has a jet fuel yield in excess of 60% by mass, said process including at least four of the following Five conversion processes: a. hydrocracking one or more of a FT kerosene and heavier material fraction and a C9 and heavier FT Syncrude fraction; b. oligomerising an FT syncrude fraction including hydrocarbons in the range C2 to C8; c. hydrotreating one or more of an FT syncrude fraction, a product from process b., and an alkylated FT syncrude fraction; d. aromatizing one or more of an FT syncrude fraction including hydrocarbons in the range C2 to C8, a product from process a., a product from process b, a product from process c., and a product from an aromatic alkylation process; and e. alkylating one or more of an FT syncrude fraction including hydrocarbons in the C2 to C6 range, a product from process b., and a product from process d.

20 Claims, 5 Drawing Sheets

(51) Int. Cl.
*C10G 45/58* (2006.01)
*C10G 50/00* (2006.01)
*C10G 57/00* (2006.01)
*C10G 57/02* (2006.01)
*C10G 65/04* (2006.01)
*C10L 1/04* (2006.01)
*C10G 3/00* (2006.01)

(52) U.S. Cl.
CPC . *C10G 2300/1022* (2013.01); *C10G 2400/08* (2013.01); *Y02P 30/20* (2015.11)

(56) References Cited

U.S. PATENT DOCUMENTS

2003/0141221 A1* 7/2003 O'Rear .................... C10G 2/32
    208/89
2005/0023188 A1* 2/2005 Connor .................. C06B 47/00
    208/15

* cited by examiner

FISCHER-TROPSCH JET FUEL PROCESS

FIELD OF THE INVENTION

The invention relates to a process for the production of jet fuel from synthetic crude produced by a Fischer-Tropsch process.

BACKGROUND OF THE INVENTION

The Fischer-Tropsch (FT) synthesis has been used for long time for the production of synthetic hydrocarbons from synthesis gas (syngas), a mixture of gases comprising mostly hydrogen ($H_2$) and carbon monoxide (CO).

The FT synthesis is a chemical reaction conducted over a metal oxide catalyst where the active metal comprises iron (Fe), cobalt (Co), ruthenium (Ru) and nickel (Ni). These catalysts can be produced by precipitation or can be supported in a metal oxide like alumina, titania, zirconia, magnesia and the like.

The FT synthesis primary reaction can be described as follows:

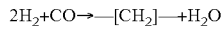

$$2H_2 + CO \rightarrow -[CH_2]- + H_2O$$

In this reaction $-[CH_2]-$ represents the primary building block of a paraffinic hydrocarbon, sometimes also referred as alkanes.

The process is carried out at elevated temperatures normally in the 200-400° C. range and high pressures of up to 40 bar-g. It can be conducted in many reactor designs like (i) tubular fixed beds, (ii) 3-phase slurry beds (a.k.a. bubble columns), (iii) high temperature circulating beds, and (iv) 2-phase fluidised beds. These had been extensively described in the literature in works like the *Fischer-Tropsch Technology* book edited by A P Steynberg and M E Dry (Elsevier, 2004).

This reaction proceeds by a mechanism known to those in the art as chain propagation. The reaction above described repeats many times resulting in the production of long chain species with up to 100 carbon atoms. The products from this synthesis are often described in the art as primary FT products, covering a very broad distillation range including FT hydrocarbon gasses (C2 to C4), FT liquid products (C5 to C21) and solid FT products (C22 and heavier) at ambient conditions. This blend has also been described as a synthetic crude or syncrude in many publications like "*Processing of Fischer-Tropsch Syncrude and Benefits of Integrating its Products with Conventional Fuels*" (NPRA Paper AM-00-51, 2000).

The primary products or syncrude from the FT synthesis can be separated into various liquid streams at processing conditions for example a C3 to C5 range, a naphtha C6 to C8 range and a C9 and heavier range.

Fuels refineries, irrespective of whether they refine crude oil, Fischer-Tropsch syncrude, coal liquids, oil shales or tar sands, generally produce a product slate that may include a kerosene cut.

The most common refining pathway for producing jet fuel (Jet A-1) from the kerosene range material is by hydroprocessing. In some instances it is desirable to produce more kerosene range material to ultimately boost jet fuel production and suggestions for doing this have been made, for example U.S. Pat. No. 4,409,092.

More recently, the United States Department of Defense expressed interest in a universal fuel for military use and preferably from a synthetic process to improve energy security (Forest, et al. 2005). This so-called Battlefield Use Fuel of the Future (BUFF), is very similar to jet fuel in specifications, but has a more stringent flash point specification (60° C. like JP-5). Ideally such a synthetic fuels refinery should produce only kerosene range material. Although a "jet fuel only" refinery may be conceptually devised, there are limits to the yield of kerosene range material that can be obtained in practise. Even conversion processes known in the art to be very kerosene selective, such as the conversion of propylene over solid phosphoric acid (Jones 1954), do not exclusively yield kerosene range material.

Straight run Fischer-Tropsch products have some inherent drawbacks in meeting Jet A-1 and/or BUFF specifications, namely a high linearity that results in a high freezing point and low temperature viscosity and a tow aromatics content. Furthermore, the Anderson-Schultz-Flory distribution often used to describe the carbon number distribution of Fischer-Tropsch products, show that the volume of straight run syncrude material in the kerosene range is limited, irrespective of the Fischer-Tropsch process. Using the Anderson-Schultz-Flory description it may be shown that the straight run kerosene production from a Fischer-Tropsch process can be optimised by tailoring the Fischer-Tropsch catalyst to have a chain growth probability factor ($\alpha$-value) preferably In the range 0.76-0.86. Most current commercial Fischer-Tropsch technologies operate outside of this range, with high temperature Fischer-Tropsch (HTFT) technology operating with an $\alpha$-value of less than 0.7, while low temperature Fischer-Tropsch (LTFT) technology generally operates with an $\alpha$-value higher than 0.9. However, even with a Fischer-Tropsch conversion process optimised for the production of kerosene range material, the straight run yield of kerosene is less than 30%. Nevertheless, the synthesis of jet fuel components from Fischer-Tropsch products and the blending thereof to produce semi-synthetic jet fuel and fully synthetic jet fuel are known in the art.

In this context, kerosene may be understood as a fraction having a carbon number range of C9 to C16, typically having a boiling point range of from 149° C. to 288° C., although variations to this definition may exist.

Preparation of Jet A-1 from low temperature Fischer-Tropsch (LIFT) hydrocracker products by distillation results in a small $C_8$-$C_{13}$ fraction that meets most of the specifications, but contains less that the required 8% aromatics of Jet A-1

The initial boiling point of the material is limited by the flash point specification of jet fuel, while the final boiling point is restricted by the Jet A-1 specification (maximum 300° C.). However, in practise a lower final boiling point is often required to meet the freezing point specification (maximum −47° C.). It has also been pointed out that the low temperature viscosity of kerosene range material from Low Temperature Fischer-Tropsch (LTFT) syncrude may present a problem by being too viscous (Lamprecht 2006).

The LTFT hydrocracker design of Shell, as commercially used in their gas-to-liquids facility in Bintulu, Malaysia, has a maximum kerosene mode of operation which is reportedly capable of refining 50% of the LTFT syncrude to kerosene range material while the naphtha and distillate products from such an operation are only blending components and not transportation fuels meeting motor-gasoline and diesel fuel specifications.

Preparation of Jet A-1 from high temperature Fischer-Tropsch (HTFT) hydrogenated straight run kerosene and iso-paraffinic kerosene from short chain olefin oligomerisation over Solid Phosphoric Acid (SPA), meets all the specifications, including density, however, the volumes that can be produced are unfortunately limited.

What is needed is a synthetic fuels facility that can maximise kerosene yield in such a way that the kerosene meets Jet A-1/JP-8 and/or JP-5/BUFF specifications.

A need has been identified for a kerosene dominant refinery in which the naphtha and distillate that are co-produced are easily refinable to meet final fuel specifications, rather than having to be sold as naphtha or distillate blend stock. This is especially pertinent in instances where the refinery is located far from markets for such intermediate products, or in instances where the refinery is used as strategic asset for the production of fuel for military use.

SUMMARY OF THE INVENTION

According to a first aspect of the invention, there is provided a Fischer-Tropsch jet fuel refining process which has a jet fuel yield in excess of 60% by mass, said process including at least four of the following five conversion processes:
   a. hydrocracking one or more of a FT kerosene and heavier material fraction and a C9 and heavier FT syncrude fraction;
   b. oligomerising an FT syncrude fraction including hydrocarbons in the range C2 to C8;
   c. hydrotreating one or more of an FT syncrude fraction, a product from process b.,and an alkylated FT syncrude fraction;
   d. aromatizing one or more of an FT syncrude fraction including hydrocarbons In the range C2 to C8, a product from process a., a product from process b, a product from process c., and a product from an aromatic alkylation process; and
   e. alkylating one or more of an FT syncrude light condensate fraction including hydrocarbons In the C2 to C6 range, a product from process b., and a product from process d.

The yield may be in excess of 70%.

The oligomerisation process b. Includes oligomerising a C3 to C8 FT syncrude fraction.

The oligomerisation process b. includes oligomerising a C6 to C8 FT syncrude fraction.

The aromatization process d. includes oligomerising a C3 to C8 FT syncrude fraction.

The alkylation process e. includes alkylating a C2 FT syncrude fraction, preferably an ethylene FT syncrude fraction.

The alkylation process e. includes alkylating a C3 to C6 FT syncrude fraction.

The conversion processes b. and e. may be combined where process b. is carried out using SPA catalyst.

In an embodiment, processes d. and e. may be combined.

The oligomersation process b. may be selected to oligomerise FT condensate to kerosene range hydrocarbons while maintaining and/or imparting cold flow properties.

The FT condensate may comprise FT hydrocarbon gas as well as FT Naphtha.

The FT condensate may Include hydrocarbons in the C3 to C8 range.

The hydrotreating process c. is selected to remove olefins and additionally to remove oxygenates to produce kerosene.

The hydrotreating process c. includes hydrotreating a C6 to C8 FT syncrude naphtha fraction.

The aromatization process d. may be selected to produce aromatics and not octane as such.

The aromatization process may convert Naphtha from hydrocracking process a.

The aromatization process d. may be selected to produce $H_2$, Benzene, Toluene, Ethylbenzene, Xylene, and kerosene range aromatics.

The aromatization process d. may be selected to avoid co-production of binuclear aromatics, such as naphthalene, that would adversely affect the smoke point of the kerosene range material.

The alkylation process e. may be selected to increase multiple alkylation of aromatics with ethylene to produce aromatics in the kerosene boiling range, while reducing the ethylene in the product.

The alkylation process e. may be selected to reduce multiple alkylation of aromatics with olefins to maximise production of alkylaromatics in the kerosene boiling range.

The hydrocracking may be carried out/performed in a hydrocracking zone containing a hydrocracking catalyst under hydrocracking conditions.

The oligomerising may be carried out/performed in a oligomerising zone containing a oligomerising catalyst under oligomerising conditions The hydrotreating may be carried out/performed in a hydrotreating zone containing a hydrotreating catalyst under hydrotreating conditions.

The aromatizing may be carried out/performed in an aromatization zone containing a aromatization catalyst under aromatization conditions.

The alkylating may be carried out/performed in a alkylation zone containing a alkylation catalyst under alkylation conditions Refining technologies that can typically be considered for the present invention include:

| Conversion Process | Catalyst type | T (° C.) | P (MPa) |
| --- | --- | --- | --- |
| [a] | Metal promoted acidic non-zeolite, eg. Pt—$SiO_2$/$Al_2O_3$ | 250-450 | 2-20 |
|  | Metal promoted acidic zeolite, eg. Ni/H-ZSM-5 | 250-450 | 2-20 |
| [b] | Solid phosphoric acid | 140-250 | 1-10 |
|  | Amorphous silica-alumina | 100-320 | 1-10 |
|  | Zeolite, such as H-ZSM-5 | 180-320 | 1-10 |
| [c] | Supported base metal, eg. Ni/$SiO_2$ | 100-300 | 1-10 |
|  | Supported noble metal, eg. Pd/$Al_2O_3$ | 25-150 | 1-10 |
| [d] | Metal promoted acidic zeolite, eg. Zn/H-ZSM-5 | 400-550 | 0-5 |
|  | Metal promoted neutral zeolite, eg. Pt/K/L-zeolite | 400-550 | 0-2 |
|  | Metal promoted acidic non-zeolite, eg. Pt/Cl/$Al_2O_3$ | 400-550 | 0-5 |
|  | Metal promoted neutralnon-zeolite, eg. Pt/$SiO_2$ | 400-550 | 0-2 |
| [e] | Solid phosphoric acid | 140-250 | 1-10 |
|  | Zeolite, eg. H-ZSM-22 | 180-450 | 1-5 |
|  | Aluminium trichloride | 100-200 | 1-5 |

It is believed that the above may result in a refinery of reduced complexity that can produce a fully synthetic jet fuel in high yield that meets international jet A-1 specifications, while co-producing chemicals and/or other transportation fuels that may also meet fuel specifications such as Euro-4.

Such a refinery may overcome some of the limitations imposed by straight run distillation yield, high linearity (high freezing point) and low aromatics content.

Depending on the selection of technology types and the ordering of the conversion units, the quantity of on specification jet fuel and quality of other products may be improved. This in itself is a further benefit of the invention, since it is flexible, it allows tailoring of the secondary products and it can accommodate different refining technology preferences.

BRIEF DESCRIPTION OF THE DRAWINGS

In the accompanying Figures, which comprise a portion of this disclosure.

DETAILED DESCRIPTION OF THE INVENTION

The invention will now be described, by way of non-limiting example only, with reference to the accompanying flow sheets.

Figure 1:
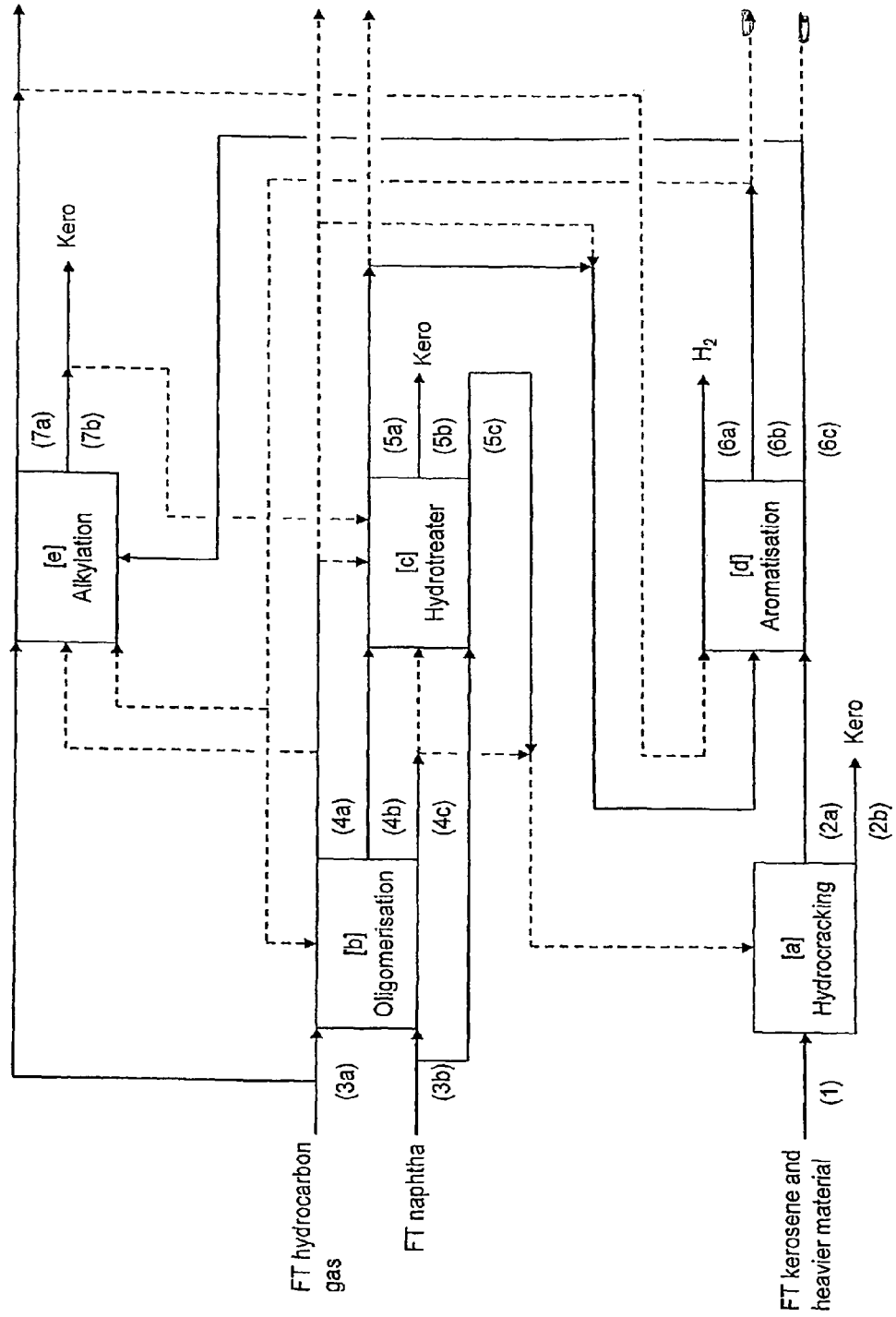
FIG. 1 is a flow diagram of the process of the present invention for producing maximum kerosene range material from Fischer-Tropsch syncrude.

This invention may be illustrated as a process of FIG. 1 which is optimised for producing maximum kerosene range material from Fischer-Tropsch syncrude. The FT syncrude typically may have a composition as follows:

| Hydrocarbon range | wt % |
|---|---|
| C2 material | 13.0% |
| C3-C5 material | 43.1% |
| C6-C8 naphtha | 24.5% |
| C9+ material | 19.5% |

The process of FIG. 1 makes use of a combination of only the following conversion processes: hydrocracking (unit [a]), oligomerisation (unit [b]), hydrotreating (unit [c]), aromatisation (unit [d]) and alkylation (unit [e]).

The kerosene range material meets international Jet A1 specifications and can optionally also be used as BUFF if the separation steps are adapted to meet the more stringent flash point specification of BUFF.

The first conversion unit of the process of FIG. 1 is unit [a] where hydrocracking takes place partly under hydroisomerisation and partly under hydrocracking conditions. Hydrocracking is known in the art for the production of kerosene from syncrude. The catalyst used for this conversion is bifunctional, containing acid and metal sites, as is well-known in the art. Its application within the present invention is different from that known in the art insofar as feed composition and unit configuration is concerned.

Olefin oligomerisation is the second conversion unit, unit [b], and is known in the art for producing kerosene range material from lighter olefinic material. The choice of oligomerisation catalyst has a significant impact on the product distribution and properties. In this invention the preferred embodiment is an olefin oligomerisation process based on either solid phosphoric acid (SPA) catalysis, or amorphous silica-alumina (ASA) catalysis, although the invention is not limited or restricted to these types. The feed may consist of hydrocarbon gas, typically $C_2$-$C_5$ stream 3a and naphtha, typically C5 and heavier material stream 3b. Feed pre-treatment is not necessarily required, although the inherent limitations of the selected catalyst should be borne in mind. For example, it is possible to feed a mixture of hydrocarbons and oxygenates typical of Fischer-Tropsch syncrude to ASA, but SPA is less oxygenate tolerant. The conversion step has three main products, namely light hydrocarbons, typically $C_2$-$C_8$ stream 4a, kerosene, typically $C_9$-$C_{14}$ stream 4b, and distillate, typically $C_{15}$ and heavier stream 4c. The ratio and composition of these products will depend on the type of oligomerisation process. For example, selecting a SPA catalyst will eliminate the production of $C_{15}$ and heavier distillate stream 4c. *The quality and yield of the desired products may also be optimised by skillful use of an internal recycle. Other aspects of this conversion process as taught in the art, such as heat management by paraffin recycle, are implied.*

Since the oligomerisation process is not suited for paraffin conversion, it may be possible to recycle the olefinic naphtha and lighter products to extinction, stream 4a, but not the paraffins in this stream. The paraffins in stream 4a can either be considered a final product, for example, the C3-C4 can be used as LPG or fuel gas and the C5+ as naphtha, or used as feed for aromatisation unit [d]. It is also not a prerequisite that the olefins in stream 4a should be recycled to extinction. The olefin containing mixture can also be used as a final product, for example, the C3-C4 could be used as LPG or fuel gas and the C5+ as Naphtha, as feed for aromatisation unit [d], as feed to alkylation unit [e] or be hydrotreated unit [c].

The kerosene product stream 4b from oligomerisation can be hydrogenated in the hydrotreater unit [c] to improve storage stability.

The distillate product stream 4c from oligomerisation can be hydrocracked unit [a] by being co-fed with the internal recycle of the hydrocracking unit. By co-feeding it with the internal recycle of the hydrocracker, over-cracking is limited and the kerosene yield is improved. A preferred embodiment of this invention routes the distillate stream 4c first to the hydrotreater unit [c], before it is used as feed stream 5c to the hydrocracker unit [a]. This is done to further reduce over-cracking and increase kerosene yield.

The third conversion unit is hydrotreater unit [c] that is used to increase the storage stability of the kerosene and to meet oxygenate related specifications such as the acid number. It is also used to provide some feed pre-treatment for processes such as aromatisation unit [d] if it is required by the aromatisation technology that has been selected. The catalyst used is a metal promoted hydrotreating catalyst as known in the art. Its use In the present invention is not different from that described In the art, although the feed material streams 3b, 4a, 4b and 4c constitutes a unique feed mixture of olefin oligomers and straight run Fischer-Tropsch syncrude. The product from the conversion process is typically iso-structural to the feed, but with the oxygenates and olefins being converted to paraffins. Three main products are distinguished based on distillation range, namely gas and naphtha, typically $C_3$-$C_8$ stream 5a, kerosene, typically $C_9$-$C_{14}$ stream 5b and distillate, typically $C_{15}$ and heavier stream 5c. Other aspects of this conversion process as taught in the art, such as hydrogen co-feeding, are implied.

The gas and naphtha product stream 5a can be used as final product, such as motor-gasoline, or it can be used as feed for aromatisation unit [d]. The preferred use will depend on the type of aromatisation technology selected, the type of oligomerisation technology used and the product composition, that is, oligomers and/or straight Fischer-Tropsch syncrude. The product thereof is a mixture of hydrotreated FT syncrude and oligomers from [b]. However, the composition depends on the specific flowscheme used.

The kerosene product stream 5b is also known as iso-paraffinic kerosene (IPK), which is known in the art as an excellent component for jet fuel.

The distillate product stream 5c can be used as feed to the hydrocracker unit [a] to improve kerosene yield as previously described.

The fourth conversion unit is aromatisation unit [d]. This process produces the aromatics needed to meet jet fuel specification, while in addition providing hydrogen to the hydrogen consuming processes detailed in this invention. The composition of feed to this unit stream 2a, 4a and/or 5a is determined by the aromatization technology selection, with two main types of technology being distinguished.

The first type of aromatisation process is naphtha aromatisation, which requires a feed In the naphtha range ($C_6$ and heavier). A preferred embodiment of this invention uses a non-acidic Pt/L zeolite based aromatisation process, which is a type of naphtha aromatisation excellently suited to the conversion of Fischer-Tropsch material. It is also possible to use standard catalytic reforming process, which is based on platinum promoted chlorided alumina catalysts, but is less efficient in the present application. This can be understood in terms of the feed properties, with a non-acidic Pt/L-zeolite process preferring linear hydrocarbons (Fischer-Tropsch syncrude is rich in linear hydrocarbons), while a Pt-alumina process prefers naphthenic (cyclo-paraffin) rich feed. In both instances the feed has to be pretreated to remove heteroatoms, which is done during hydrocracking unit [a] and hydrotreating, unit [c].

The second type of aromatisation process is light hydrocarbon aromatisation, which can convert a feed consisting of $C_3$ and heavier hydrocarbons. This type of aromatisation process is based on metal promoted H-ZSM-5 zeolite catalysts, with the metals Ga and Zn being most often used. This conversion can also be achieved with an unpromoted H-ZSM-5 catalyst, but it is not a preferred embodiment, since the metal is required for hydrogen desorption as molecular hydrogen. The ZSM-5 based processes are more tolerant to heteroatom compounds in the feed, such as oxygenates and the feed can be used without prior hydrotreating stream 4a. However, it is known in the art that oxygenates are detrimental to catalyst lifetime and the feed selection and a combination of untreated stream 4a and pretreated stream 2a and/or stream 5a feeds or either one can be considered.

The type of aromatisation process not only determines the feed requirements, but also the yield structure, which is different for the difference processes. In a naphtha aromatisation process any $C_5$ and lighter hydrocarbons formed during the process can be considered fatal conversion to such products, since it cannot be converted to aromatics by recycling. Conversely, in a light hydrocarbon aromatisation process the $C_3$ and heavier hydrocarbons can be recycled to improve aromatics yield. Despite differences such as these, three main product fractions are produced during aromatisation, namely light gas, typically hydrogen and $C_1$-$C_2$ hydrocarbons stream 6a, gas and light naphtha, typically $C_3$-$C_6$ hydrocarbons stream 6b and aromatics rich naphtha, typically $C_5$ and heavier aromatics and $C_7$ and heavier hydrocarbons stream 6c. Other feed and product streams as known from the art are implied.

The light gas stream 6a is a hydrogen rich product. This is an excellent source of hydrogen and the hydrogen can be recovered by processes known in the art, such as pressure swing absorption. Depending on the process and yield structure, this may provide sufficient hydrogen for the hydrocracking unit [a] and hydrotreating unit [c] conversion processes. Excess hydrogen can be exported to the Fischer-Tropsch gas loop to increase syncrude yield. The hydrogen lean gas can be used as fuel gas, or used as feed to synthesis gas production, depending on the nature of the Fischer-Tropsch technology.

The gas and light naphtha stream 6b composition is dependent on the aromatisation process. In the case of naphtha aromatisation it will be very paraffinic and can be used as final product as liquid petroleum gas, for blending and/or fuel gas. It will be possible to recycle little of this product, although it is technically possible. If a light naphtha aromatisation process has been selected, it can be recycled to extinction, or on account of its olefin content it can also be routed to oligomerisation unit [b] or alkylation unit [e].

The aromatics rich naphtha stream 6c is the source of aromatics needed to meet the jet fuel aromatics specification. Part of this product can directly be used as final fuel, but a preferred embodiment of this invention routes at least part of this product to an alkylation process unit [e].

The aromatics produced during aromatisation in unit [d] are mainly in the $C_6$-$C_9$ aromatics range. Not all of the aromatics can directly be incorporated in the kerosene, since it would cause the jet fuel to have a too low flash point. This shortcoming is overcome by alkylating the aromatics with olefins in an alkylation process unit [e] to increase the average molecular mass of the aromatics. The composition of the olefinic and aromatic feed components, as well as the type and operation of the alkylation process is selected to maximise the production of kerosene range aromatics.

The aromatic feed stream 6c can be prefractionated to increase the $C_6$-$C_8$ aromatic fraction in the feed, but this is not a prerequisite. The olefinic feed can be derived directly from the Fischer-Tropsch hydrocarbon gas stream 3a, olefin containing light hydrocarbons from oligomerisation stream 4a and the olefin containing gas and naphtha product from aromatisation stream 6b if applicable. These feeds can be selected in any appropriate combination.

In a preferred embodiment of this invention, the olefin oligomerisation unit [b] and aromatic alkylation unit [e] processes are combined as a single process. This will reduce the number of conversion units required by the present invention from five to four. However, this preferred embodiment limits the catalyst selection to that taught in the art. If the alkylation is done separately from oligomerisation, the catalyst selection for this process can be expanded to include catalyst types such as zeolites. In a further possible embodiment of this invention the alkylation can be done separately, but in such a way that the alkylation unit also does some oligomerisation to ease the load on the oligomerisation unit.

The alkylation process can be operated In such a way that it produces mainly a kerosene product stream 7b, although some lighter boiling material may be formed stream 7a. As is taught in the art, this may require recycling of part of the product or the inclusion of a transalkylation step to maximise kerosene production. Depending on the level of oligomerisation in this unit, it may be necessary to hydrotreat the olefins in the kerosene cut in the hydrotreater unit [c] before the kerosene is used for jet fuel. Other feed and product streams as known from the art are implied. Part of this kerosene product may also be blended with other fuel products or used as a final product, such as cumene.

EXAMPLES

The following examples illustrate the present Invention, although it should not be construed as limiting the invention in any way.

Example 1

Figure 2:
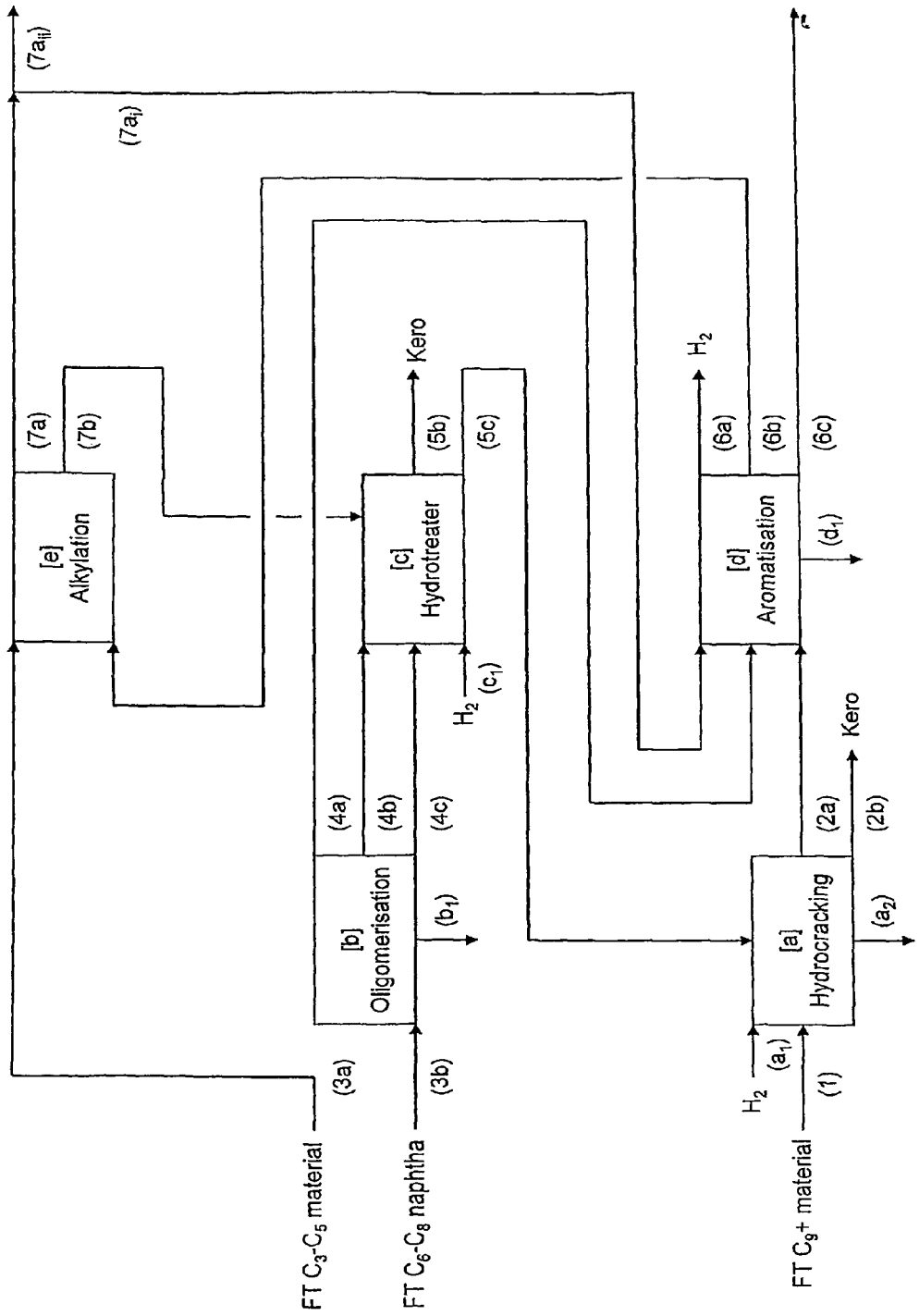
FIG. 2 is a flow diagram of a jet fuel refinery design employing the process of the present invention to produce jet fuel from Fischer-Tropsch syncrude according to Example 1.

The jet fuel refinery design in this example as shown in FIG. 2 is based on the feed from a HTFT. The aim of this example is to show how much jet fuel can be produced from Fischer-Tropsch syncrude using the present invention.

The Fischer-Tropsch $C_9$ and heavier syncrude (boiling point typically >130° C.) is used as feed stream 1 to the hydrocracker unit [a], which is operated in accordance with the description of this invention. The $C_{16}$ and heavier distillate range product (boiling point typically >280° C.) from olefin oligomerisation stream 4c is first hydrotreated to produce stream 5c and then also hydrocracked. This results in the production of mainly kerosene stream 2b with a yield of around 75% on a fresh feed basis. The $C_3$-$C_8$ light hydrocarbons stream 2a are routed to the aromatisation unit unit [d].

Fischer-Tropsch $C_6$-$C_8$ syncrude (boiling range typically 40-130° C.) is used without pretreatment as feed stream 3b to the oligomerisation unit [b]. The oligomerisation process uses an ASA catalyst, which is capable of dealing with the oxygenates that are present in this feed. The $C_8$ and lighter hydrocarbons stream 4a produced during oligomerisation is routed to the aromatisation unit. The $C_9$ and heavier hydrocarbon product streams 4b and 4c are hydrotreated in unit [c], resulting in isostructural saturated products. The hydrotreater unit [c] also hydrotreats the kerosene range mixture of oligomerisation and alkylation products stream 7b from the alkylation unit [e] to saturate the olefins and improve the storage stability of the resultant product. The kerosene range product stream 5b is a jet fuel component, while the distillate stream 5c is routed to the hydrocracker unit [a] as already mentioned.

The aromatisation unit unit [d] is based on a process using a metal promoted H-ZSM-5 catalyst. The feed streams to this unit comprise of $C_3$-$C_8$ hydrocarbons from the hydrocracker stream 2a, $C_5$-$C_8$ hydrocarbons from oligomerisation stream 4a and $C_3$-$C_4$ hydrocarbons from alkylation stream 7a. The aromatisation unit is operated with an internal recycle to convert the $C_3$-$C_6$ hydrocarbons (lower boiling than benzene). The light gas stream 6a is used as source of hydrogen for the refinery. The naphtha fraction (boiling range from benzene to xylene) has been routed to alkylation stream 6b, while the heavier aromatic fraction in the kerosene boiling range is used as jet fuel component stream 6c.

The $C_6$-$C_8$ aromatics contained in the product from aromatisation stream 6b is alkylated with an olefin rich Fischer-Tropsch $C_3$-$C_5$ feed stream 3a. A combined alkylation oligomerisation process based on a SPA catalyst is used, which not only alkylates the aromatics, but also oligomerises the excess olefins to kerosene. The $C_5$-$C_8$ product stream $7a_{ii}$ is retained as a final naphtha which forms part of what is termed "fatal naphtha production" to avoid build-up of inerts in the refinery recycle streams, while the $C_3$-$C_4$ fraction stream $7a_i$ is recycled back to the aromatisation unit [d]. The kerosene range product stream 7b is hydrotreated to saturate the olefins before being used as a jet fuel component.

This refinery design yielded a naphtha:kerosene split of 11:89, with the kerosene cut meeting specifications for fully synthetic Jet A1. The naphtha is low in aromatics, but rich in olefins and requires further refining to be used as transportation fuel. A summary of the streams considered are given in Table 1 and are reported on a total Fischer-Tropsch syncrude basis of 500 000 kg/h (excluding water gas shift gases). The refinery design presented in this example does not show processing of the Fischer-Tropsch $C_1$-$C_2$ hydrocarbons or oxygenates dissolved in the aqueous product from Fischer-Tropsch synthesis. Chemicals such as ethylene, ethanol, acetone, isopropanol, n-propanol and methyl ethyl ketone can be recovered from these fractions by processes known in the art. The $C_3$ and heavier oxygenates can also be converted to olefins and processed with the other FT $C_3$-$C_5$ feed stream 3a to increased the volume production of jet fuel on the same Fischer-Tropsch feed basis.

TABLE 1

Summary of streams shown in FIG. 2 of example 1.

| Stream | Description | From | To | Flow (kg/h) |
| --- | --- | --- | --- | --- |
| (#a1) | H2 | H2 | [a] | 1340 |
| (#a2) | Waste/H2O | [a] | Waste | 2403 |
| (#b1) | H2O | [c] | Waste | 1078 |
| (#c1) | H2 | H2 | [c] | 1955 |
| (#d1) | Fuel gas | [d] | Fuel gas | 7075 |
| (1) | FT C9+ | HTFT | [a] | 75564 |
| (2a) | C3-C8 | [a] | [d] | 22568 |
| (2b) | Kero | [a] | Tank | 71095 |
| (3a) | FT C3-C5 | HTFT | [e] | 167344 |
| (3b) | FT C6-C8 | HTFT | [b] | 94916 |
| (4a) | ASA C8- | [b] | [d] | 34802 |
| (4b) | ASA kero | [b] | [c] | 40044 |
| (4c) | ASA C16+ | [b] | [c] | 18992 |
| (5b) | Kero | [c] | Tank | 208965 |
| (5c) | Hydr.C16+ | [c] | [a] | 19162 |
| (6a) | H2 | [d] | H2 | 1124 |
| (6b) | Bz-Xyl cut | [d] | [e] | 49677 |
| (6c) | Kero | [d] | Tank | 16639 |
| ($7a_i$) | LPG | [e] | [d] | 17145 |
| ($7a_{ii}$) | Naphtha | [e] | Tank | 32740 |
| (7b) | Kero | [e] | [c] | 167136 |

Example 2

Figure 3:
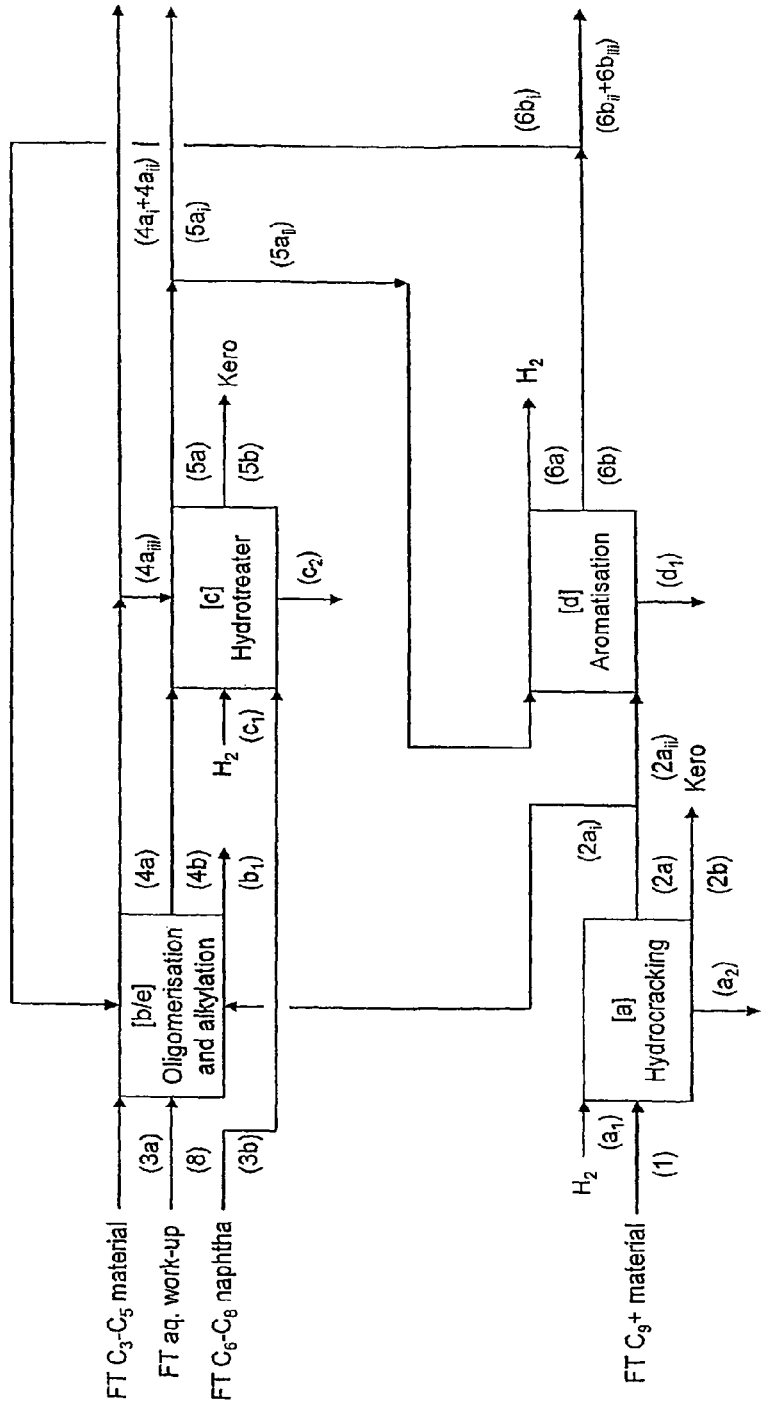
FIG. 3 is a flow diagram of a second jet fuel refinery design employing the process of the present invention to produce jet fuel from Fischer-Tropsch syncrude according to Example 2.

The jet fuel refinery design in this example and as shown in FIG. 3 is based on the same feed as Example 1. The difference lies in the selection of oligomerisation, aromatisation and alkylation processes. The aim of this example is to show that this invention is also capable of maximising jet fuel production, while meeting motor-gasoline specifications (Euro-4) for the naphtha. A further objective of this example is to illustrate how integration of the Fischer-Tropsch aqueous product work-up is beneficial.

The hydrocracker unit [a], which is operated in accordance with this invention, converts the Fischer-Tropsch $C_9$ and heavier syncrude stream 1 to kerosene stream 2b and lighter products stream 2a. Only the $C_6$-$C_8$ fraction stream $2a_{ii}$ is routed to the aromatisation unit [d], while the $C_3$-$C_5$ fraction stream $2a_i$ is routed to the oligomerisation unit [b] to be used as diluent for heat management.

The oligomerisation and alkylation conversion is combined in a single unit [b/e] by making use of a SPA catalyst operated in olefin rich conversion mode. This eliminates the need for a separate alkylation unit. The feed streams to this unit are the Fischer-Tropsch $C_3$-$C_5$ fraction stream 3a, the $C_3$-$C_5$ fraction from the hydrocracker stream $2a_i$, benzene from the aromatisation unit stream 6b, and a olefin stream from the Fischer-Tropsch aqueous product refinery stream 8. The olefins from the aqueous product refinery are typically produced by selective hydrogenation of the carbonyls to alcohols and dehydration of the $C_3$ and heavier alcohols to olefins, as previously described in the art. During this combined olefin oligomerisation and aromatics alkylation process, the benzene is converted mainly to cumene, with heavier aromatics being formed to a lesser degree. This does not disrupt the normal oligomerisation process. The products from this process are $C_3$-$C_4$ liquid petroleum gas stream $4a_i$, unhydrogenated $C_4$-$C_8$ motor-gasoline stream $4a_{ii}$, as well as a naphtha stream $4a_{iii}$ and kerosene stream 4b fraction that are routed to the hydrotreater unit [c]. The nature of conversion over a SPA catalyst is such that the production of material heavier than kerosene is very little and it is customary in the art to have a small bottoms purge stream to remove these products.

The hydrotreater unit [c] hydrogenates the olefins and oxygenates present in the Fischer-Tropsch $C_6$-$C_8$ naphtha stream 3b, as well as the products from the combined oligomerisation-alkylation unit streams $4a_{iii}$ and 4b. Although the hydrogenation may be done in a single unit, the feed and product points should be split in such a way that the Fischer-Tropsch naphtha is not mixed with the oligomerisation product. This allows the unit to use a more optimal catalyst loading diagram and increases the overall quality of the final products. The hydrotreating may also be done in separate reactors. The hydrogenate kerosene stream 5b is a jet fuel component, while the hydrotreated naphtha range oligomerisation product stream $5a_i$ is a motor-gasoline component. The hydrotreated Fischer-Tropsch $C_6$-$C_8$ naphtha stream $5a_{ii}$ is used as feed to the aromatisation unit unit [d].

The aromatisation unit [d] is based on a non-acidic Pt/L-zeolite catalysed process. The feed is naphtha in the $C_6$-$C_8$ range, obtained from hydrocracking stream $2a_{ii}$ and hydrotreating stream $5a_{ii}$. This process has a high hydrogen and aromatics yield. The hydrogen can be recovered from the light gas stream 6a and is in excess of the requirements of hydrocracking and hydrotreating units [a] and [c]. This hydrogen can be exported to the Fischer-Tropsch gas loop, with beneficial effect on the syncrude yield. This potential benefit is noted, but not illustrated by this example. The naphtha product is separated to yield benzene stream $6b_i$, a liquid petroleum gas fraction stream $6b_{ii}$ and an aromatic gasoline stream $6b_{iii}$. This type of aromatisation process is such that kerosene production is determined by the feed and in this specific instance no kerosene forming material has been used as feed.

The refinery in this example yielded a product split of motor-gasoline:jet fuel of 28:72, after inclusion of ethanol from Fischer-Tropsch aqueous product refining to meet a 10% fuel oxygenate mandate. The calculated motor-gasoline and jet fuel properties are given in Table 2.

TABLE 2

Calculated motor-gasoline and jet fuel properties for Example 2, shown in FIG. 3.

| Property | Example 2 | Specifications | |
|---|---|---|---|
| Motor-gasoline | | Euro-4 | |
| RON | 99 | 95 | minimum |
| MON | 89 | 85 | minimum |

TABLE 2-continued

Calculated motor-gasoline and jet fuel properties for Example 2, shown in FIG. 3.

| Property | Example 2 | Specifications | |
|---|---|---|---|
| Vapour pressure (kPa) | 60 | 60 | maximum |
| Density (kg/m3) | 765 | 720-775 | range |
| Olefins (vol %) | 0 | 18 | maximum |
| Aromatics (vol %) | 31 | 35 | maximum |
| Oxygenates (vol %) | 10 | 15 | maximum |
| Benzene (vol %) | 0.9 | 1 | maximum |
| Jet fuel | | Jet A1 | |
| Density (kg/m3) | 781 | 775-840 | range |
| Aromatics (vol %) | 25 | 8-25 | range |
| Naphthalene (vol %) | <1 | 3 | maximum |
| Sulphur (mass %) | <0.001 | 0.3 | maximum |

A summary of the streams considered are given in Table 3 and are reported on a total Fischer-Tropsch Syncrude basis of 500 000 kg/h (excluding water gas shift gases). The processing of the. Fischer-Tropsch $C_1$-$C_2$ hydrocarbons is not shown in this example, from which it is possible to recovery chemicals such as ethylene and sell the remainder as synthetic natural gas, or use it as fuel gas. The refining of the oxygenates dissolved in the aqueous product from Fischer-Tropsch synthesis is implicit to this example, with ethanol being purified as motor-gasoline additive, while the heavier alcohols and all the carbonyl compounds are converted to olefins.

TABLE 3

Summary of streams shown in FIG. 3 of example 2.

| Stream | Description | From | To | Flow (kg/h) |
|---|---|---|---|---|
| (#a1) | H2 | H2 | [a] | 1116 |
| (#a2) | Waste/H2O | [a] | Waste | 1821 |
| (#b1) | Fuel oil | [b] | Fuel oil | 1240 |
| (#c1) | H2 | H2 | [c] | 3665 |
| (#c2) | waste/H2O | [c] | Waste | 1337 |
| (#d1) | Fuel gas | [d] | Fuel gas | 5568 |
| (1) | FT C9+ | HTFT | [a] | 75564 |
| ($2a_i$) | C3-C5 | [a] | [b] | 6171 |
| ($2a_{ii}$) | C6-C8 | [a] | [d] | 7404 |
| (2b) | Kero | [a] | Tank | 61284 |
| (3a) | FT C3-C5 | HTFT | [b] | 167344 |
| (3b) | FT C6-C8 | HTFT | [c] | 94916 |
| ($4a_i$) | LPG | [b] | Tank | 16402 |
| ($4a_{ii}$) | Naphtha | [b] | Tank | 28062 |
| ($4a_{iii}$) | Naphtha | [b] | [c] | 7125 |
| (4b) | Kero | [b] | [c] | 176128 |
| ($5a_i$) | Naphtha | [c] | Tank | 7252 |
| ($5a_{ii}$) | C6-C8 | [c] | [d] | 95619 |
| (5b) | Kero | [c] | Tank | 177626 |
| (6a) | H2 | [d] | H2 | 5952 |
| ($6b_i$) | Benzene | [d] | [b] | 39695 |
| ($6b_{ii}$) | LPG | [d] | Tank | 5743 |
| ($6b_{iii}$) | Naphtha | [d] | Tank | 46065 |
| (8) | FT aq. | HTFT | [b] | 15747 |

Example 3

Figure 4:
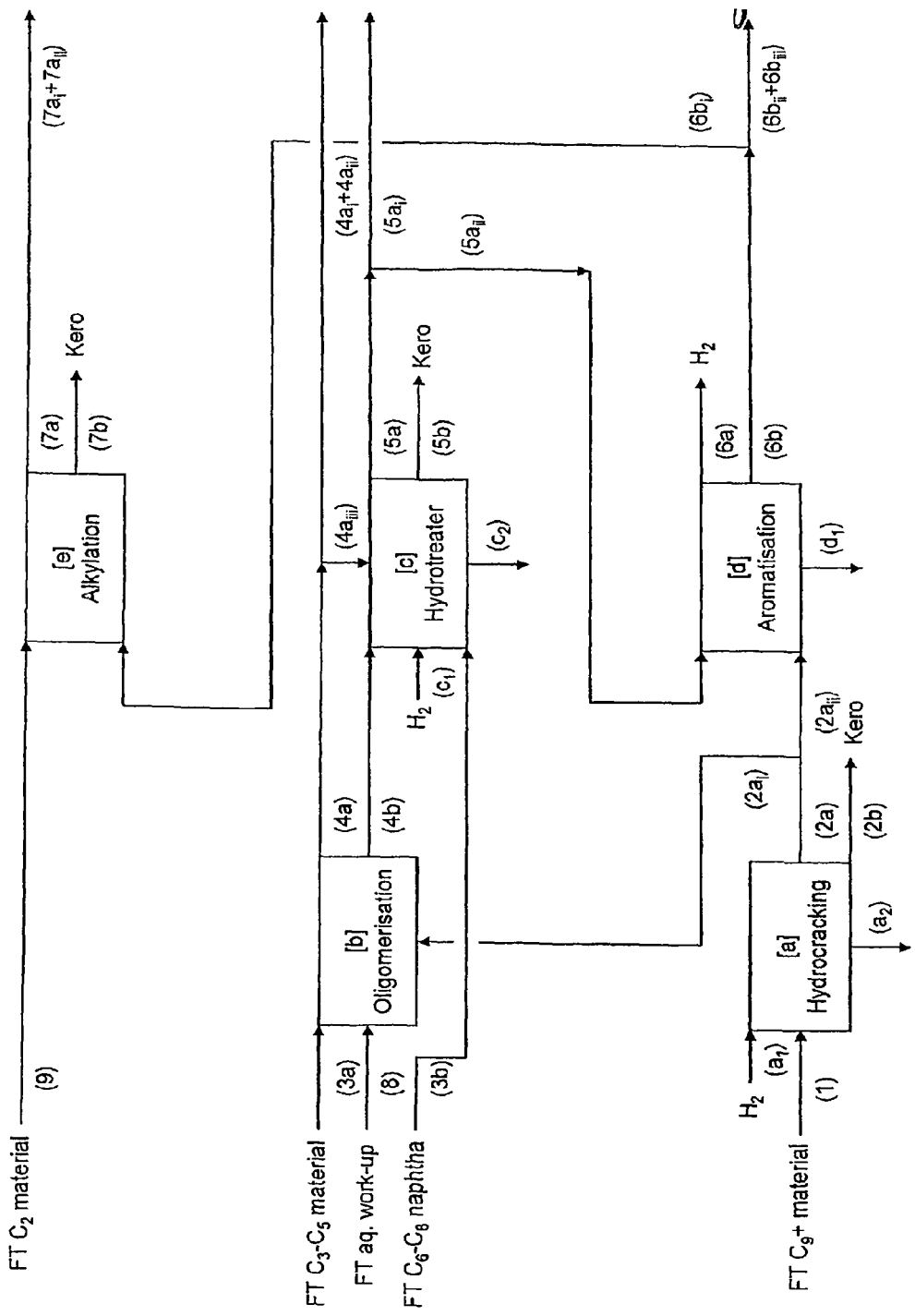
FIG. 4 is a flow diagram of a third jet fuel refinery design employing the process of the present invention to produce jet fuel from Fischer-Tropsch syncrude according to Example 3.

The jet fuel refinery design in Example 2 was modified by changing the way in which the aromatic alkylation is performed. In this example as shown in FIG. 4, a separate alkylation unit is used based on a zeolite catalyst, which is operated in such a way that the mono-alkylated aromatics are recycled to increase the yield of di-alkylated aromatics. Furthermore, ethylene has been selected as alkylating olefin to boost the overall yield of motor-gasoline and jet fuel on similar feed basis as Example 2, without significantly changing the motor-gasoline to jet fuel ratio.

The feeds, operation and products from the hydrocracker unit [a] is the same as in Example 2.

The oligomerisation unit [b], like in example 2, is based on a process using a SPA catalyst. The feeds are similar to that in Example 2, the only difference being that no aromatics are fed to this unit. The product is therefore not rich in alkyl aromatics, but consists mainly of aliphatic hydrocarbons. The product is separated in different distillation fractions, namely $C_3$-$C_4$ liquid petroleum gas stream $4a_i$, unhydrogenated $C_4$-$C_8$ motor-gasoline stream $4a_{ii}$, as well as a naphtha stream $4a_{iii}$ and kerosene stream $4b$ fraction that are routed to the hydrotreater unit [c].

The hydrotreater unit [c] is similar to that in Example 2, although the composition of some streams is different. This is especially noticeable in the kerosene feed stream $4b$ which is not rich in alkyl aromatics.

The aromatisation process unit [d] is the same in terms of feed, operation and products. The only difference is in the routing of the benzene fraction stream $6b_i$, which is now sent to the alkylation unit unit [e].

In this example the alkylation unit unit [e] is based on ethylene alkylation of benzene over a zeolite catalyst, such as H-ZSM-22. The main differences to commercial practice for the production of ethyl benzene, are the use of an ethylene/ethane mixture from Fischer-Tropsch as feed stream 9 in addition to benzene stream $6b_i$ and the recycling of the mono-alkylated benzene with the benzene to increase the yield of diethyl benzene. The main products are kerosene range aromatics stream $7b$, aromatic naphtha stream $7a_{ii}$ and $C_2$-rich fuel gas stream $7a_i$.

A summary of the streams considered are given in Table 4 and are reported on a total Fischer-Tropsch syncrude basis of 500 000 kg/h (excluding water gas shift gases). The description of context is similar to that of Example 2, but in this example the processing of the Fischer-Tropsch $C_2$ hydrocarbons have been included. The product split of motor-gasoline:jet fuel is 28:72 and similar, albeit slightly Improved fuel properties have been obtained compared to Example 2.

TABLE 4

Summary of streams shown in FIG. 4 of example 3.

| Stream | Description | From | To | Flow (kg/h) |
|---|---|---|---|---|
| (#a1) | H2 | H2 | [a] | 1116 |
| (#a2) | Waste/H2O | [a] | Waste | 1821 |
| (#c1) | H2 | H2 | [c] | 3933 |
| (#c2) | waste/H2O | [c] | Waste | 1337 |
| (#d1) | Fuel gas | [d] | Fuel gas | 5568 |
| (1) | FT C9+ | HTFT | [a] | 75564 |
| ($2a_i$) | C3-C5 | [a] | [b] | 6171 |
| ($2a_{ii}$) | C6-C8 | [a] | [d] | 7404 |
| (2b) | Kero | [a] | Tank | 61284 |
| (3a) | FT C3-C5 | HTFT | [b] | 167344 |
| (3b) | FT C6-C8 | HTFT | [c] | 94916 |
| ($4a_i$) | LPG | [b] | Tank | 16878 |
| ($4a_{ii}$) | Naphtha | [b] | Tank | 29522 |
| ($4a_{iii}$) | Naphtha | [b] | [c] | 7862 |
| (4b) | Kero | [b] | [c] | 135000 |
| ($5a_i$) | Naphtha | [c] | Tank | 8002 |
| ($5a_{ii}$) | C6-C8 | [c] | [d] | 95619 |
| (5b) | Kero | [c] | Tank | 136753 |
| (6a) | H2 | [d] | H2 | 5952 |
| ($6b_i$) | Benzene | [d] | [e] | 39695 |
| ($6b_{ii}$) | LPG | [d] | Tank | 5743 |
| ($6b_{iii}$) | Naphtha | [d] | Tank | 46065 |
| ($7a_i$) | Fuel gas | [e] | Fuel gas | 22784 |
| ($7a_{ii}$) | Naphtha | [e] | Tank | 1967 |
| (7b) | Kero | [e] | Tank | 65293 |
| (8) | FT aq. | HTFT | [b] | 15747 |
| (9) | FT C2's | HTFT | [e] | 50349 |

Example 4

The jet fuel refinery design in this example (FIG. 5) is based on the feed from a LTFT process with similar syncrude properties as that commercially operated in South Africa by Sasol in Sasolburg. The same principle can also be extended to the Oryx GTL facility in Qatar and the Shell Bintulu GTL facility in Malaysia. The aim of this example is to show that despite the considerable difference in Fischer-Tropsch carbon number distribution and composition between HTFT and LTFT syncrude, this invention is applicable to both and is not restricted by the alpha-value of the Fischer-Tropsch catalyst. (A mixture of syncrudes with different carbon number distributions can therefore also be considered as feed).

Figure 5:
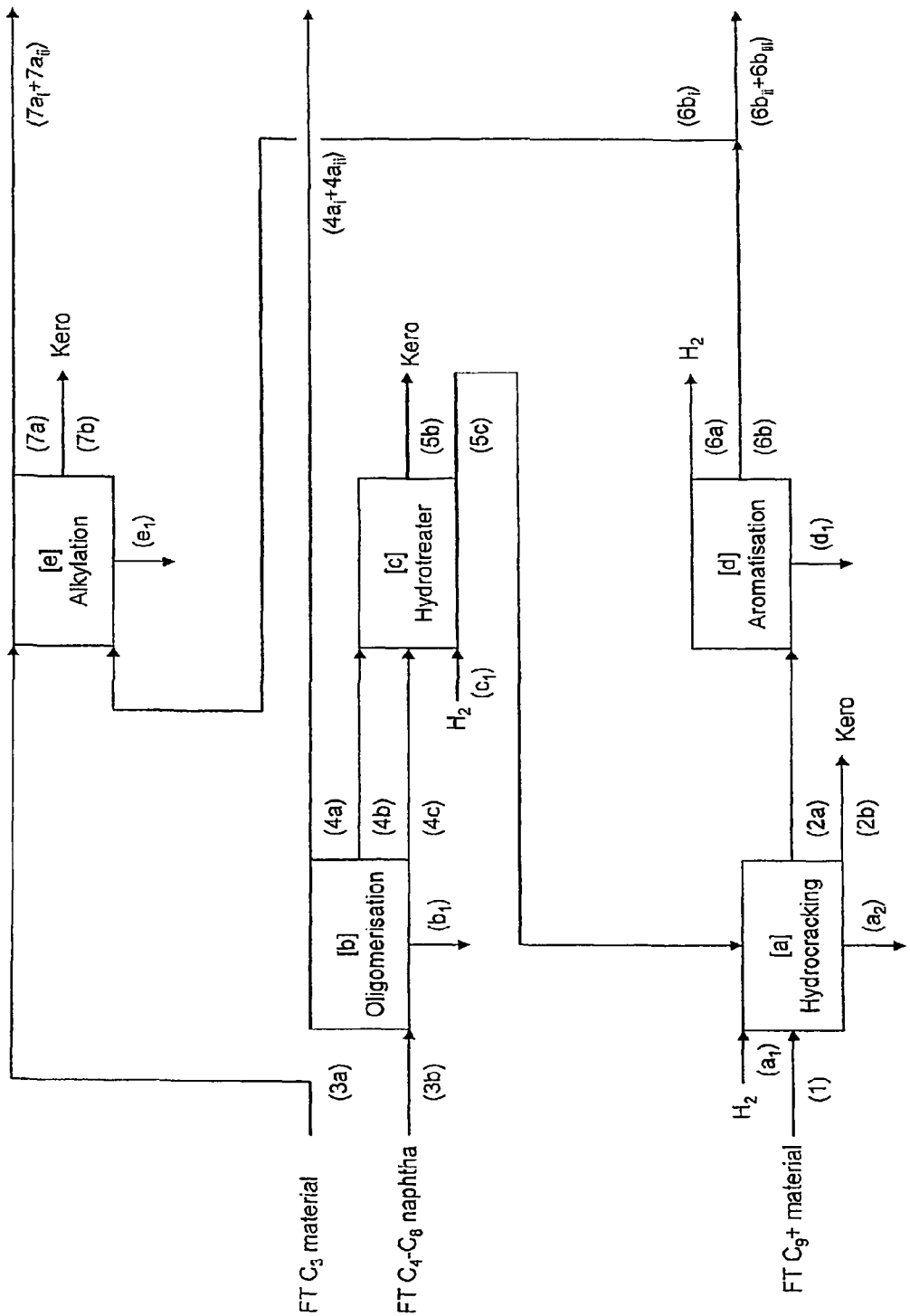
FIG. 5 is a flow diagram of a fourth jet fuel refinery design employing the process of the present invention to produce jet fuel from Fischer-Tropsch syncrude according to Example 4.

The hydrocracker (FIG. 5, unit [a]) is operated in accordance to the description of the present invention. The main feed to this unit is the $C_9$ and heavier fraction from low temperature Fischer-Tropsch synthesis (FIG. 5, feed 1). Contrary to HTFT feed, the LTFT feed to this unit contains a significant (>50%) "residue" or paraffin wax fraction. The hydrotreated $C_{16}$ and heavier fraction from olefin oligomerisation (FIG. 5, stream 5c) is also fed to the hydrocracker. The two main products from this unit are $C_3$-$C_8$ light hydrocarbons (FIG. 5, stream 2a) that is used as feed for aromatisation (FIG. 5, unit [d]) and kerosene (FIG. 5, stream 2b) that is a final jet fuel component.

The $C_3$ and heavier hydrocarbons can be separated from LTFT product gas under pressure, without the need for cryogenic cooling. The $C_4$-$C_8$ fraction (FIG. 5, stream. 3b) is used as feed to the oligomerisation unit (FIG. 5, unit [b]). The oligomerisation process uses an ASA catalyst that can deal with the oxygenates present in this feed. The light product, which consists of some light olefins and mostly $C_4$ paraffins (FIG. 5, stream $4a_i$) can be used as liquefied petroleum gas (LPG), motor-gasoline blending component or routed to the aromatisation unit (FIG. 5, unit [d]). In the present example it is used as LPG. The naphtha product, which is a mixture of $C_5$-$C_6$ olefins and paraffins (FIG. 5, stream $4a_{ii}$) can be hydrotreated, or directly be used as olefic naphtha as in this example. It may also be used as feed to the aromatisation unit. The kerosene (FIG. 5, stream 4b) and heavier distillate (FIG. 5, stream 4c) are hydrotreated in the olefin hydrotreated (FIG. 5, unit [c]). The hydrogenated kerosene (FIG. 5, stream 5b) is a final jet fuel component, while the hydrogenated distillate (FIG. 5, stream 5c) is used as feed for the hydrocracker (FIG. 5, unit [a]).

The aromatisation unit (FIG. 5, unit [d]) is based on a metal promoted H-ZSM-5 catalysed process. The feed to this unit consists of $C_3$-$C_8$ hydrocarbons from the hydrocracker (FIG. 5, stream 2a). It has been noted that aromatic production can be further increased by using the naphtha from oligomerisation (FIG. 5, stream 4a) as feed too, but this has not been done in this example. The aromatisation unit is operated with an internal recycle to convert the $C_3$-$C_6$ hydrocarbons (lower boiling than benzene), although once through operation can also be considered. Hydrogen can be recovered from the light gas (FIG. 2, stream 6a), while the remainder of the light gas can be used as fuel gas. The heavier products are fractionated and differently applied. The fraction containing all the benzene and some of the toluene (FIG. 5, stream $6b_i$) is used as aromatic feed for the alkylation unit (FIG. 5, unit [e]). The fraction containing the remainder of the toluene and some of the $C_8$ aromatics are retained as naphtha (FIG. 5, stream $6b_{ii}$), while the heavier kerosene fraction is used as jet fuel component (FIG. 5, stream $6b_{iii}$).

The aromatic alkylation (FIG. 5, unit [a]) is done with the propylene rich LTFT $C_3$ cut. This unit is operated in alkylation mode, with internal recycle of aromatics to limit oligomerisation as side-reaction as is well-known in the art. The technology used can be based on solid phosphoric acid (SPA) or a zeolite catalyst. In this example a SPA based technology was used to limit multiple alkylation. The products from this unit are light gases, typically propane rich (FIG. 5, stream $7a_i$), a naphtha (FIG. 5, stream $7a_{ii}$) and an aromatic kerosene (FIG. 5, stream 7b) that is a final jet fuel component that may optionally be hydropolished to improve storage stability.

A summary of the streams considered are given in Table 5 and are reported on a total Fischer-Tropsch syncrude basis of 500 000 kg/h (excluding water gas shift gases). The processing of the Fischer-Tropsch $C_1$-$C_2$ hydrocarbons and oxygenates dissolved in the aqueous product are not shown in this example. The product split of motor-gasoline:jet fuel is 21:79. The Jet fuel conforms to Jet A1 specifications, but the motor-gasoline is very aromatic and cannot be consider a final transportation fuel.

TABLE 5

Summary of streams shown in FIG. 5 of example 4.

| Stream | Description | From | To | Flow (kg/h) |
|---|---|---|---|---|
| (#a1) | H2 | H2 | [a] | 5430 |
| (#a2) | Waste/H2O | [a] | Waste | 647 |
| (#b1) | H2O | [b] | Waste | 961 |
| (#c1) | H2 | H2 | [c] | 348 |
| (#d1) | Fuel gas | [d] | Fuel gas | 15243 |
| (#e1) | Waste | [e] | Waste | 1030 |
| (1) | FT C9+ | LTFT | [a] | 363504 |
| (2a) | C3-C8 | [a] | [d] | 160539 |
| (2b) | Kero | [a] | Tank | 219201 |
| (3a) | FT C3 | LTFT | [e] | 22180 |
| (3b) | FT C4-C8 | LTFT | [b] | 61628 |
| ($4a_i$) | LPG | [b] | Fuel gas | 4524 |
| ($4a_{ii}$) | Naphtha | [b] | [c] | 21441 |
| (4b) | ASA kero | [b] | [c] | 23351 |
| (4c) | ASA C16+ | [b] | [c] | 11351 |
| (5b) | Kero | [c] | Tank | 23598 |
| (5c) | Hydr.C16+ | [c] | [a] | 11452 |
| (6a) | H2 | [d] | H2 | 2422 |
| ($6b_i$) | Bz-rich | [d] | [e] | 50707 |
| ($6b_{ii}$) | Tol/Xyl-rich | [d] | Tank | 49840 |
| ($6b_{iii}$) | Kero | [d] | Tank | 42327 |
| ($7a_i$) | LPG | [e] | Fuel gas | 5026 |
| ($7a_{ii}$) | Naphtha | [e] | Tank | 15863 |
| (7b) | Kero | [e] | Tank | 50968 |

The invention claimed is:

1. A Fischer-Tropsch jet fuel refining process which has a jet fuel yield in excess of about 60% by mass, said process including at least four of the following five conversion steps:
   a) hydrocracking one or more of a FT kerosene and heavier material fraction and C9 and heavier FT syncrude fraction;
   b) oligomerizing an FT syncrude fraction including hydrocarbons in the range of about C2 to about C8;
   c) hydrotreating one or more of an FT syncrude fraction, a product from step b, and an alkylated FT syncrude fraction;
   d) aromatizing one or more of an FT syncrude fraction including hydrocarbons in the range of about C2 to about C8, a product from process a, a product from step b, a product from step c, and a product from an aromatic alkylation process; and
   e) alkylating one or more of an FT syncrude fraction including hydrocarbons in the range of about C2 to about C6, a product from step b, and a product from step d.

2. The process as claimed in claim 1, wherein the conversion steps b and e are combined when step b is carried out using SPA catalyst.

3. The process as claimed in claim 1, wherein steps d and e are combined.

4. The process as claimed in claim 1, wherein the oligomerization step b is selected to oligomerize a C3 to C8 FT syncrude fraction to kerosene range hydrocarbons while maintaining and/or imparting cold flow properties.

5. The process as claimed in claim 3, wherein the oligomerzation step b is selected to oligomerize a C3 to C8 FT syncrude fraction to kerosene range hydrocarbons while maintaining and/or imparting cold flow properties.

6. The process as claimed in claim 1, wherein the hydrotreating step c removes olefins and additionally removes oxygenates to produce keronsene.

7. The process as claimed in claim 3, wherein the hydrotreating step c removes olefins and additionally removes oxygenates to produce kerosene.

8. The process as claimed in claim 4, wherein the hydrotreating step c removes olefins and additionally removes oxygenates to produce kerosene.

9. The process as claimed in claim 5, wherein the hydrotreating step c removes olefins and additionally removes oxygenates to produce kerosene.

10. The process as claimed in claim 1, wherein the aromatization step d is selected to produce aromatics and not octane as such.

11. The process as claimed in claim 3, wherein the aromatization step d is selected to produce aromatics and not octane as such.

12. The process as claimed in claim 4, wherein the aromatization step d is selected to produce aromatics and not octane as such.

13. The process as claimed in claim 5, wherein the aromatization step d is selected to produce aromatics and not octane as such.

14. The process as claimed in claim 6, wherein the aromatization step d is selected to produce aromatics and not octane as such.

15. The process as claimed in claim 10, wherein the aromatization step d converts naphtha from hydrocracking step a.

16. The process as claimed in claim 15, wherein the aromatization step d produces $H_2$, benzene, toluene, ethylbenzene, xylene, and kerosene range aromatics.

17. The process as claimed in claim 16, wherein the aromatization step d avoids co-production of binuclear aromatics.

18. The process as claimed in claim 1, wherein the alkylation step e increases multiple alkylation of aromatics with ethylene to produce aromatics in the kerosene boiling range, while reducing the ethylene in the product.

19. The process as claimed in claim 5, wherein the alkylation step e increases multiple alkylation of aromatics with ethylene to produce aromatics in the kerosene boiling range, while reducing the ethylene in the product.

20. The process as claimed in claim 10, wherein the alkylation step e increases multiple alkylation of aromatics with ethylene to produce aromatics in the kerosene boiling range, while reducing the ethylene in the product.

\* \* \* \* \*